United States Patent [19]

Mahler et al.

[11] Patent Number: 4,646,879
[45] Date of Patent: Mar. 3, 1987

[54] AIR DUCT, OR THE LIKE, FOR INSTRUMENT PANEL FOR AUTOMOTIVE VEHICLES

[75] Inventors: Gert Mahler, Radenvormwald; Günter Dietz, Wuppertal; Heinz-Jürgen Falkenroth, Ennepetal, all of Fed. Rep. of Germany

[73] Assignee: Gebr. Happich GmbH, Fed. Rep. of Germany

[21] Appl. No.: 764,848

[22] Filed: Aug. 12, 1985

[30] Foreign Application Priority Data

Aug. 16, 1984 [DE] Fed. Rep. of Germany ....... 3430121

[51] Int. Cl.⁴ ............................................. B60K 37/00
[52] U.S. Cl. ...................................... 180/90; 98/2.08; 280/752; 296/72; 296/208
[58] Field of Search ........................... 180/90; 280/752; 296/208, 70, 72, 191, 192; 98/2.09, 2.08, 2.04, 2

[56] References Cited

U.S. PATENT DOCUMENTS

| | | | |
|---|---|---|---|
| 3,367,710 | 2/1968 | Barenyi | 180/90 |
| 4,223,754 | 9/1980 | Mizuno | 98/2.09 |
| 4,391,465 | 7/1983 | Piano | 296/208 |
| 4,560,186 | 12/1985 | Onitsuka | 180/90 |

FOREIGN PATENT DOCUMENTS 45270  3/1984  Japan ..................................... 296/70

Primary Examiner—John J. Love
Assistant Examiner—Everett G. Diederiks, Jr.
Attorney, Agent, or Firm—Ostrolenk, Faber, Gerb & Soffen

[57] ABSTRACT

An instrument panel for an automotive vehicle is attached to a rigid beam that extends across the vehicle body beneath the windshield. The instrument panel is a plastic injection molding. Its outer surface may be provided with cushioning material. At the underside of the panel, beneath its top portion, at least two ribs are provided, which extend across the width of the vehicle and of the instrument panel, are spaced apart and have free edges that rest against the beam inside the vehicle, so that the instrument panel, the ribs and the beam together define an air duct extending across the width of the instrument panel. A seal may be provided at the free edge of each rib for sealing it to the beam. The air duct communicates with windshield defroster nozzles, or the like in the instrument panel.

17 Claims, 6 Drawing Figures

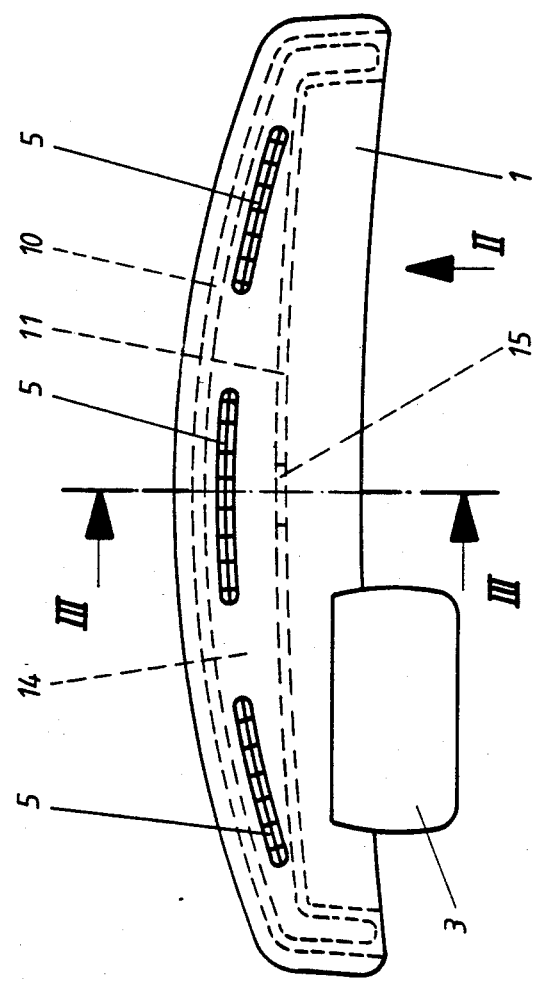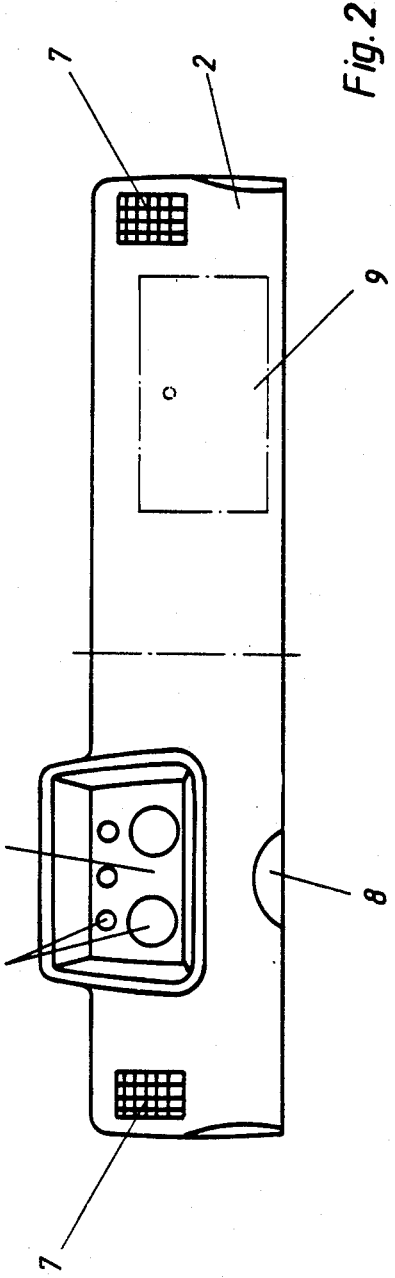

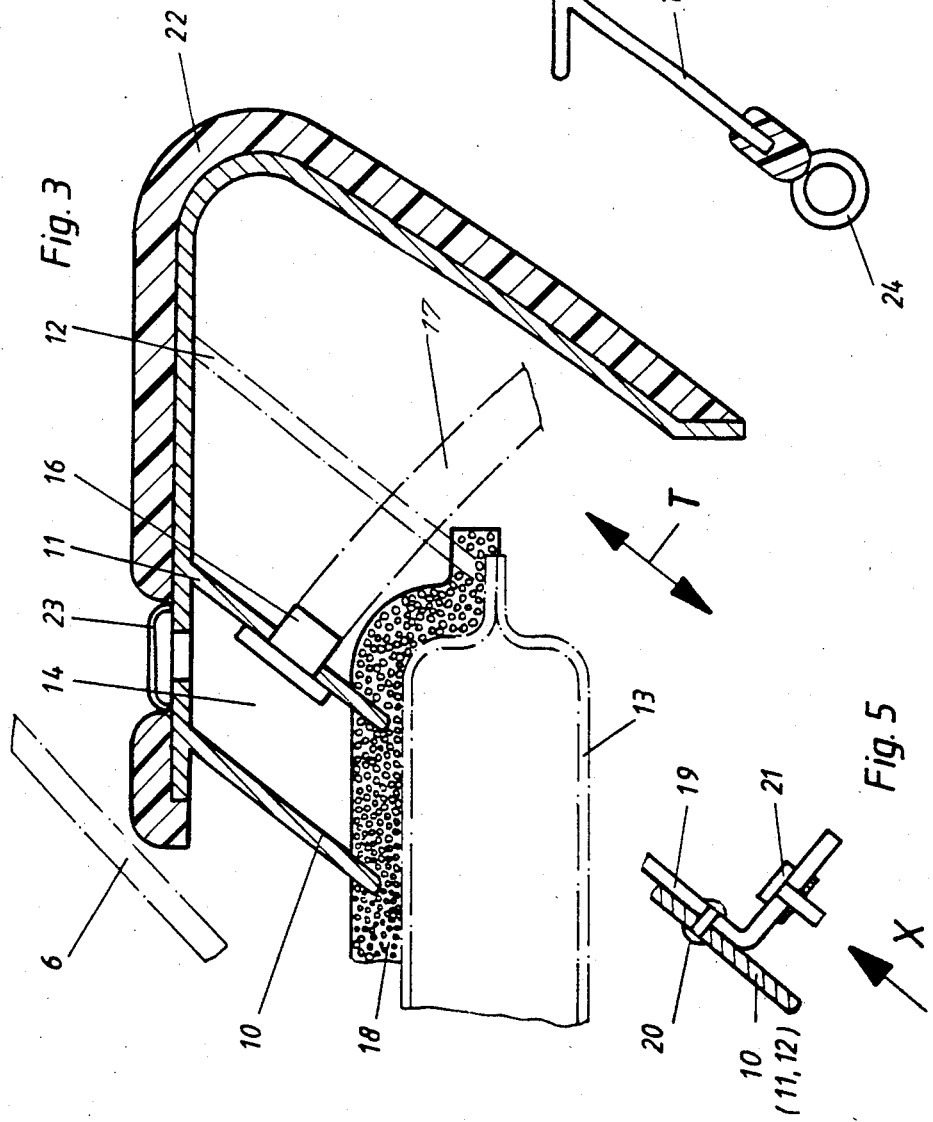

AIR DUCT, OR THE LIKE, FOR INSTRUMENT PANEL FOR AUTOMOTIVE VEHICLES

BACKGROUND OF THE INVENTION

The present invention relates to an instrument panel for automotive vehicles which can be fastened to a rigid beam, box girder, or the like, of the body of the vehicle that extends over the width of the vehicle below the windshield.

Vehicle dashboards include an instrument panel. They have a horizontal top part, extending rearwardly from the windshield, and have a generally vertical downwardly extending part. Some molded instrument panels are thin, and of generally L-shaped transverse cross-section.

Federal Republic of Germany Patent No. 11 30 775 describes a dashboard with an instrument panel. To the rear of the panel, a flat structural part is fastened. Together with the instrument panel, that structural part forms a hollow space which serves as an air conduit that is in communication with windshield defroster nozzles that are developed in the instrument panel. In this dashboard, the flat structural part is an open profile of elastic material attached to, but not integrated in the body of the dashboard, below the front region of the instrument panel. The structural part is formed of resilient material. The windshield defroster nozzles are arranged in that structural part. After being assembled with the instrument panel, the structural part forms an air duct which stiffens the preassemblable subassembly. This dashboard therefore consists of an instrument panel together with a profiled structural part. These parts must be manufactured individually in separate manufacturing devices and be combined after their manufacture, using suitable sassembly devices.

SUMMARY OF THE INVENTION

The object of the invention is to develop an instrument panel of the aforementioned type simply and inexpensively and to avoid a multipart construction.

A further object is to make the panel so stable that it is rigid enough to be premounted with instruments and to be fastened to the rigid beam beneath the windshield by only a few fastening elements.

According to the invention, the instrument panel is developed as an L-shaped cross-section plastic injection molding. On its rear side, and particularly the underside of its top part, the panel has at least two ribs which are formed integrally on it. The free edges of the ribs can rest on the beam, so that together with that beam, the ribs form at least one air duct which is in communication with windshield defroster nozzles.

The advantage of the invention is that the complete instrument panel is made in one piece and may furthermore be assembled with the use of fewer tools. This one-piece development, including the ribs, provides a considerable saving, as compared with the prior art, with respect to materials, labor, time and machinery. According to the invention, the ribs are developed integrally on the instrument panel. They perform dual functions. On the one hand, together with the rigid beam of the vehicle body, which is always present, they form the required air duct. On the other hand, they impart the necessary strength and stiffness to the instrument panel. Since the air duct is closed and thereby completed only upon the mounting of the instrument panel, as a result of the placement of the edges of the ribs against the beam, the instrument panel is particularly easy to assemble with respect to the premounting of the instruments, since there are no closed and thus inaccessible hollow spaces.

In each case, a seal is preferably provided between the free edges of the ribs and the beam. For this purpose, sealing strips can be fastened on the ribs, protruding beyond the edges of the ribs. It is particularly advantageous if the seals are insulating layers which are arranged on the beam and into which the free edges of the ribs can be pressed.

Furthermore, at least one of the ribs may have an opening for connecting an air feed line. Such an opening can be formed directly upon the manufacture of the instrumental panel, avoiding the need for subsequent working. Furthermore, a connecting nipple for a hose, or the like, can be mounted at the opening, resulting in simplified mounting.

As another feature, angle pieces or similar holding elements are provided on the ribs. These are preferably equipped with non-loosenably premounted screws for attaching the instrument panel to the beam. The holding elements can also be premounted, i.e. fastened to the instrument panel, for instance by rivets, before the dashboard is installed. The arms of the holding elements which bear the screws should be arranged within the channel formed by and between the ribs. This affords the possibility of tightening and, if necessary, also loosening the screws by means of a screwdriver introduced through the windshield defroster nozzles which are fed from the duct.

The instrument panel, which is developed as a plastic injection molding, may carry a cushioning layer on its outer side, consisting of foam plastic, or the like, where the cushioning is preferably directly foamed on the injection molding.

Other objects and features are described below with reference to the drawings.

BRIEF DESCRIPTION OF THE DRAWINGS

FIG. 1 is a top view of the instrument panel;

FIG. 2 is a view of the instrument panel seen in the direction indicated by the arrow II;

FIG. 3 is a section approximately along the line III-—III of FIG. 1;

FIG. 4 shows an alternate sealing technique for the ribs on the instrument panel;

FIG. 5 is a side view showing securement of a rib to its fastening element; and

FIG. 6 shows modified ribs for the panel.

DESCRIPTION OF THE PREFERRED EMBODIMENTS

The vehicle instrument panel shown in FIGS. 1 and 2 is generally L-shaped and has a top 1, a front 2 and a customary scoop-shaped region 3 with openings 4 in the rear wall for the installation of instruments. The top side 1 is provided with openings which serve as defroster outlet nozzles 5 intended for feeding air, and particularly temperature-conditioned air, to the windshield 6, as indicated in dash-dot line in FIG. 3. Further defroster nozzles 7 are provided at the end regions of the front side 2. These are intended to enable air to also be conducted to the side windows of the car. The instrument panel is provided at the lower edge of its front side 2 with a cutout 8 for a vehicle steering column (not shown). It may also be provided with a glove compartment having a cover 9 in front of it, as indicated in dash-dot line in FIG. 2.

In its simplest embodiment, the instrument panel is developed as a single-piece plastic injection molding. It is provided on its rear side with two spaced apart ribs 10 and 11, which are developed integrally with it and are of the same material. As shown in FIGS. 1 and 3, the ribs are on the underside of the top portion of the panel. Normally, only two ribs 10 and 11 are provided. They form a duct, as shown in FIG. 3, which extends over the length of the instrument panel, i.e. across the width of the vehicle, as shown in FIG. 1. Provision of an optional third rib 12, indicated in dash-dot line, causes two adjacent ducts to be formed on opposite sides of rib 11.

As can be noted from FIG. 3, the ribs 10, 11, 12 do not meet the top side 1 of the instrument panel at right angles. Instead, they are adapted to, i.e. parallel to, the contour of the front side 2 of the instrument panel, which extend downwardly in skirt form. This shape of the panel and the ribs makes it possible to manufacture the instrument panel in a relatively simple injection mold, consisting of an upper mold half and a lower mold half, and it enables removal of the completely formed instrument panel. The removal is made particularly easy by moving the mold halves apart in the directions indicated by the double-ended arrow T.

Through integral development of the ribs 10 and 11 and, if present, the rib 12, with the instrument panel, and the panel is, on the one hand, imparted a self-supporting stiffness and stability which makes it possible to install it, with premounted instruments, in a vehicle. On the other hand, the ribs 10 and 11 (and possibly 12) provide the instrument panel with at least one duct which is in communication with the defroster nozzles 7. After the mounting of the instrument panel, that duct is closed by a rigid beam or box-shaped girder 13, which forms part of the body of the vehicle and thereby completes an air duct 14. The free edges of the ribs 10 and 11 rest on the beam and close the duct. Of course, the spacing and height of the ribs 10 and 11 (and 12 if present) must be determined and dimensioned as required for the desired air flow. It is also clear that the ribs 10, 11 and 12 need not necessarily extend parallel to each other.

In the central region of the instrument panel, the rib 11 has an opening 14 (FIG. 1). A bushing 16 (FIG. 3) is inserted and fastened in the opening 15 for connecting an air feed line 17, which is indicated in dot-dash lines. In the air feed region, the air duct 14 (FIG. 1) has a relatively large cross-section opening, and the cross-section gradually decreases in the direction toward the defroster nozzles 7.

To conduct the air to the car windows with as little loss as possible, tight application of the free edges of the ribs 10 and 12 against the beam 13 is advisable. If the beam 13 is provided with an insulating layer 18 (anti-noise coating, or the like), as is frequently the case, a dependable seal without additional parts can be obtained by pressing the edges of the ribs into the insulating layer 18 (FIG. 3). Otherwise, sealing strips 24 are fastened, for instance by being pushedon, on the free edge regions of the ribs 10 and 11, and 12, if present. In FIG. 4, sealing strips 24 of different development have been shown by way of example.

The instrument panel may be fastened to the beam 13 by angle brackets 19, shown in FIGS. 5 and 6, or by similar fastening elements which, in their turn, are fastened by the ribs by, for instance, rivets 20. Screws 21, required for fastening the instrument panel to the beam 13, are preferably premounted on the fastening elements. The screws 21 can be screwed into holes in the beam 13 by an ordinary screwdriver introduced through the defroster nozzles 5.

For deluxe car fittings, the instrument panel is provided on its outside with a layer of cushioning 22 which may consist of foam plasatic and be foamed directly on the injection molding which has been previously coated, for instance, with a coupling agent. In this case, the defroster nozzles 5 are also covered with rosettes 23 having grid-like passage openings.

As one special feature of the invention, the development of the ribs 10, 11 and 12 may include grooves or slots, as shown in FIG. 6. These grooves 25 are provided on the left and right alongside of each angle strap 19 and extend in the direction T of removal of the panel from the mold. The grooves 25 define weakened sections which improve the absorption and dissipation of impact energy as a result of the reduced resistance to deformation and breakage in these regions of the instrument panel caused by the weakenings.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. An instrument panel for an automotive vehicle, wherein the vehicle includes a driver's section, a windshield and also includes a rigid beam in the body of the vehicle, said beam extending across the width of the vehicle below the windshield;

the instrument panel comprising a body with a front side facing the driver's section and a rear side; at least two ribs on the rear side of the instrument panel and extending away from the rear side of the instrument panel to free edges of the ribs; the ribs extending in a direction along the length of the instrument panel across the width of the vehicle; the ribs being spaced apart defining a duct space therebetween and having their free edges abutting against the beam so that the beam, the rear side of the instrument panel which is spaced from and opposed to the beam, and said at least two spaced apart ribs together define an air duct which extends along the length of the instrument panel; said instrument panel also including air oulet nozzles which extends through the instrument panel and communicate the duct with the driver's section.

2. The instrument panel of claim 1, wherein the nozzles are aimed at the windshield for defining windshield defroster nozzles.

3. The instrument panel of claim 1, wherein the panel is comprised of a plastic injection molding.

4. The instrument panel of claim 3, wherein on the panel outer surface, a layer of cushioning material is disposed.

5. The instrument panel of claim 4, wherein the layer of cushioning material is foam plastic.

6. The instrument panel of claim 1, further comprising a seal located between the free edges of the ribs and the beam.

7. The instrument panel of claim 6, wherein the seal comprising sealing strips which extend over the free edges of the ribs and are fastened to the beam.

8. The instrument panel of claim 6, wherein the seal comprises an insulating layer disposed on the beam, and the free edges of the ribs being pressed into the insulating layer.

9. The instrument panel of claim 6, further comprising an opening through at least one of the ribs for an air feed line.

10. The instrument panel of claim 6, further comprising means for attaching the instrument panel to the beam.

11. The instrument panel of claim 10, wherein the attachment means comprise angle pieces each having a first leg attached to one of the ribs and a second leg attached to the beam.

12. The instrument panel of claim 11, further comprising non-loosenably premounted screws in each second leg of the angle piece for attaching the instrument panel to the beam.

13. The instrument panel of claim 6, wherein the instrument panel is generally L-shaped in transverse cross-section, with a top facing side and a rearwardly facing side meeting to define the L-shape thereof; the ribs being defined beneath the top facing side.

14. The instrument panel of claim 13, wherein the panel is comprised of a plastic injection molding.

15. The instrument panel of claim 13, wherein the rearwardly facing side of the panel and the ribs extend parallel.

16. An instrument panel for an automotive vehicle, wherein the vehicle includes a driver's section, a windshield and also includes a rigid beam in the body of the vehicle, said beam extending across the width of the vehicle below the windshield;

the instrument panel comprising a body with a front side facing the driver's section and a rear side; at least two ribs on the rear side of the instrument panel and extending away from the rear side of the instrument panel to free edges of the ribs; the ribs extending in a direction along the length of the instrument panel across the width of the vehicle; the ribs being spaced apart defining a duct space there between and having their free edges abutting against the beam so that the beam, the rear side of the instrument panel which is spaced from and opposed to the beam, and said at least two spaced apart ribs together define an air duct which extends along the length of the instrument panel; air outlet nozzles extending through the instrument panel communicating the duct with the driver's section; a seal located between the free edges of the ribs and the beam; said at least two ribs having grooves defined across the length thereof which permit the ribs to deform upon impact.

17. The instrument panel of claim 16, wherein the panel is secured to the beam by means of angle pieces having a first leg attached to one of the ribs and a second leg attached to the beam; the angle pieces being fastened to a rib between two grooves along the rib.

* * * * *